United States Patent
Bradley et al.

(10) Patent No.: US 9,970,528 B2
(45) Date of Patent: May 15, 2018

(54) TRANSMISSION SYSTEM

(71) Applicant: ROLLS-ROYCE PLC, London (GB)

(72) Inventors: Jonathan P Bradley, Bristol (GB); Jason J Madge, Dursley (GB)

(73) Assignee: ROLLS-ROYCE plc, London (GB)

( * ) Notice: Subject to any disclaimer, the term of this patent is extended or adjusted under 35 U.S.C. 154(b) by 0 days. days.

(21) Appl. No.: 15/438,314

(22) Filed: Feb. 21, 2017

(65) Prior Publication Data
US 2017/0261096 A1    Sep. 14, 2017

(30) Foreign Application Priority Data
Mar. 10, 2016    (GB) .................................. 1604119.6

(51) Int. Cl.
  *F16H 57/08* (2006.01)
  *F02C 7/36* (2006.01)
  *F16H 1/28* (2006.01)
(52) U.S. Cl.
  CPC ............. *F16H 57/082* (2013.01); *F02C 7/36* (2013.01); *F16H 1/28* (2013.01); *F05D 2260/40311* (2013.01)
(58) Field of Classification Search
  None
  See application file for complete search history.

(56) References Cited

U.S. PATENT DOCUMENTS

| | | | | |
|---|---|---|---|---|
| 5,466,198 A | * | 11/1995 | McKibbin | F02C 6/206 475/346 |
| 8,727,935 B2 | * | 5/2014 | Coffin | F02C 3/107 475/346 |
| 8,968,148 B2 | * | 3/2015 | Matsuoka | F16H 1/2818 475/331 |
| 9,267,389 B2 | * | 2/2016 | Pescosolido | F16H 57/082 |
| 2004/0259679 A1 | | 12/2004 | Becquerelle et al. | |
| 2010/0105516 A1 | * | 4/2010 | Sheridan | F01D 25/18 475/346 |
| 2014/0309078 A1 | * | 10/2014 | Curti | F16H 1/2827 475/331 |

OTHER PUBLICATIONS

Sep. 2, 2016 Search Report issued in British Patent Application No. 1604119.6.

* cited by examiner

*Primary Examiner* — Justin Holmes
(74) *Attorney, Agent, or Firm* — Oliff PLC

(57) ABSTRACT

A transmission system for transmitting a change of speed between two rotating shafts, includes a planetary gear box having a sun gear arranged for rotation with a first shaft travelling at a first speed. Planet gears contained within a ring gear are arranged to orbit the sun gear when the sun gear rotates and the ring gear is in a fixed position. Each planet gear is mounted for rotation on a centrifugal carrier. An output carrier includes a body having arms and the arms are each aligned with an axis of rotation of a planet gear and held to the centrifugal carrier by one or more supports extending in a radial plane. An output shaft extends from the body in coaxial alignment with the input shaft. A connector which is stiff in a radial dimension but flexible under torsional load is arranged between the output carrier and the centrifugal carrier.

10 Claims, 5 Drawing Sheets

PRIOR ART

PRIOR ART

TRANSMISSION SYSTEM

TECHNICAL FIELD OF THE INVENTION

The present invention concerns planetary gear boxes, in particular (but not exclusively) when used for transmission of speed reduction between rotating shafts of a gas turbine engine.

BACKGROUND TO THE INVENTION

Planetary gear boxes are known. FIG. 1 shows a sectional view of a known planetary gear box arrangement. The gear box comprises a sun gear 1 centred around a centreline C-C. The sun gear 1 is mounted to an input shaft 2 which is mounted for rotation in a first bearing 3. The sun gear 1 meshes with an array of planet gears 4 (only one of which is shown) arranged around the toothed circumference of the sun gear 1. A ring gear 5 encircles and meshes with the planet gears 4. The ring gear 5 is fixed in position and so, upon rotation of the sun gear 1, the planetary gears 4 are forced to rotate around their individual axes A-A and travel within the ring gear 4 and around the sun gear 1.

The planet gears 4 are each mounted for rotation on a centrifugal carrier 7 which in turn connects to an arm 6a of an output carrier 6b via a spherical bearing or pivot 7a. The arm 6a is arranged to transmit the output via an output shaft 6 which nominally shares a common axis C-C with the input shaft 2. The output shaft 6 is further mounted for rotation with respect to a static casing by means of a bearing or pivot 9. The centrifugal carrier 7 is arranged for rotation about the axis C-C by means of a bearing 8. The centrifugal carrier 7 and the output shaft 6 rotate together.

FIG. 2 illustrates the planet gear 4, the output carrier 6a, 6b and centrifugal carrier 7 in closer detail. It will be appreciated that in order to maintain gear alignment in the system, centrifugal carrier 7 must be made stiff. In particular the centrifugal carrier 7 is radially stiff and contains the centrifugal loading of the planet gears 4. However, the planet gear 4 is inevitably subjected to a torsion load T. Due to the rigidity of the carrier alignment, shear loads may be applied to the centrifugal carrier 7 and planet gears 4. These are minimised by the provision of a bearing 10 where the arm 6a engages with the centrifugal carrier 7. Typically, the bearing 10 is a spherical bearing. Bending loads act on the bearing 10 and can result in a torsional deformation of the arm 6a whose axis A'-A' moves out of alignment with the axis A-A of the planet gear 4. Due to clearances and manufacturing tolerances amongst the carrier components, the difference between axes A'-A' and A-A may vary between planet gears held in the centrifugal carrier 7. Consequently, as the gears 1, 4 rotate, local orbiting of the arms 6a occurs. This orbiting can result in imbalance and vibration in the transmission system and ultimately throughout the machine in which it operates. In particular, this imbalance can tend to move the output shaft 6 and input shaft 2 out of alignment along the common axis C-C.

STATEMENT OF THE INVENTION

In accordance with the present invention there is provided a transmission system for transmitting a change of speed between two rotating shafts, the transmission system comprising;
a planetary gear box comprising a sun gear arranged for rotation with a first shaft travelling at a first speed, a plurality of planet gears contained within a ring gear and arranged to orbit the sun gear when the sun gear rotates and the ring gear is in a fixed position, each planet gear mounted for rotation on a centrifugal carrier,
an output carrier comprising a body having a plurality of arms each aligned with an axis of rotation of a planet gear and located within the centrifugal carrier by one or more supports extending in a radial plane from the arm, and an output shaft extending from the body in coaxial alignment with the input shaft, wherein a connector which is stiff in a radial dimension but flexible under torsional load is arranged between the output carrier and the centrifugal carrier.

The connector's structure is optimised to provide a radial stiffness which is sufficient to maintain adequate centreline control between the centrifugal carrier and the output carrier along a common centreline C-C and to keep imbalance loads within acceptable levels, whilst minimising the torsional stiffness of the component. By mounting the proposed connector between the two carrier structures, the basic function of a rotatable bearing (high radial stiffness with low rotational stiffness) can be achieved. Importantly, the proposed connector structure accommodates this rotation without any sliding contacts, that is, purely through elastic deformation of the connector. Therefore there is significantly reduced susceptibility to clearance causing wear compared to a bearing in this location. The connector of the invention allows the output carrier and centrifugal carrier to remain co-axially aligned whilst allowing small angular deflection of these sub-structures to be accommodated without generating large shear loads between them. These shear loads, if not mitigated, would be deleterious to gear alignment.

The radial stiffness of the connector of the invention is selected to be sufficient to maintain sufficient concentricity between the centrifugal carriers and the output carrier. The skilled addressee will appreciate that the required stiffness is related to the loading of the system when in operation as well as other factors such as rotational speed, component size and an acceptable level of unbalance for a given application. The torsional flexibility of the connector is designed to minimise the transfer of torsional load between the output carrier and centrifugal carrier, thereby avoiding shear loading that would lead to adverse misalignment the axes of the planet gears. It is well within the capability of the skilled addressee to select appropriate materials and/or dimensions for the connector that will provide appropriate radial stiffness for a system in which the loads are known.

In some embodiments, the connector comprises a spoked structure having an inner and an outer annular ring, the spokes extending between the inner and outer annular ring. The spokes may extend radially, though this is not essential. Spokes may be inclined at an angle to the radius. In use, the outer annular ring is secured to the centrifugal carrier and the inner annular ring is secured to the output carrier. Alternatively, the centrifugal carrier and output carrier may be arranged such that the outer annular ring is secured to the output carrier and the inner annular ring is secured to the centrifugal carrier. The spokes are configured to provide the required radial stiffness and torsional flexibility. For example, these properties may be achieved through the geometry of the spokes and/or the material properties of the spokes. Optionally, the spokes may comprise a material engineered to have directional stiffness. In another option the spokes may be wide in an axial direction and thin in a circumferential dimension.

It will be appreciated that inner and outer rings are not essential elements of the connector. For example, a connector may have just one of an inner and outer ring or neither an inner ring nor an outer ring. For example, a radially extending structure might be integrally formed with one or both of the adjacent carriers. In another example, circumferentially spaced support structures may be provided at a radially inner and/or outer extreme of the connector by means of which the connector can be secured to the adjacent components.

Optionally, the connector is provided in the form of a disc from which material has been removed to provide an inner annulus and a plurality of extensions in a radial plane connected by an outer annulus. The extensions may extend radially or at an angle to a radius. In another option, the connector may be built to a pre-defined shape using an additive layer manufacturing method. In another option, the connector is fabricated by the joining of radially extending elements to annular parts which can be connected to the carriers. The radially extending elements need not be separated by spaces, for example, a thinner layer of material may separate the radially extending elements.

In another alternative, the connector may comprise a diaphragm. In another option, the connector may comprise a web extending in a radial plane.

BRIEF DESCRIPTION OF THE ACCOMPANYING FIGURES

Embodiments of the invention will now be further described with reference to the accompanying Figures in which.

DETAILED DESCRIPTION OF FIGURES AND EMBODIMENTS

Figure 1:
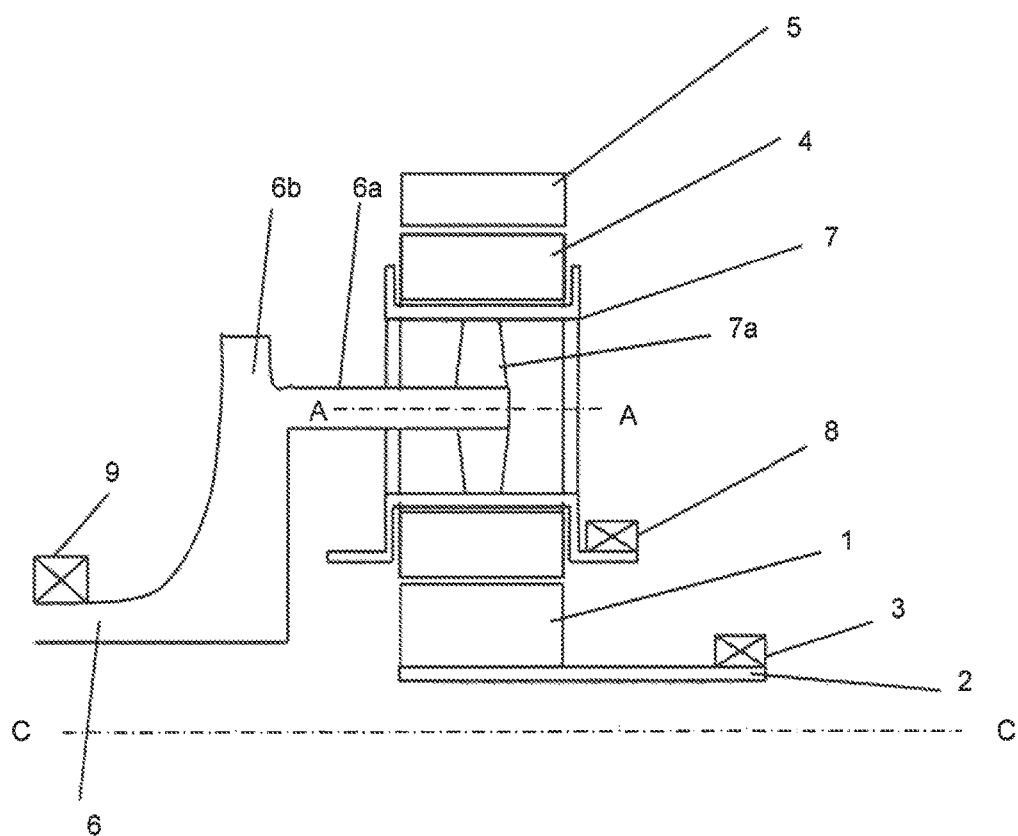
FIG. 1 shows a sectional view of a known planetary gear box arrangement.
Figure 2:
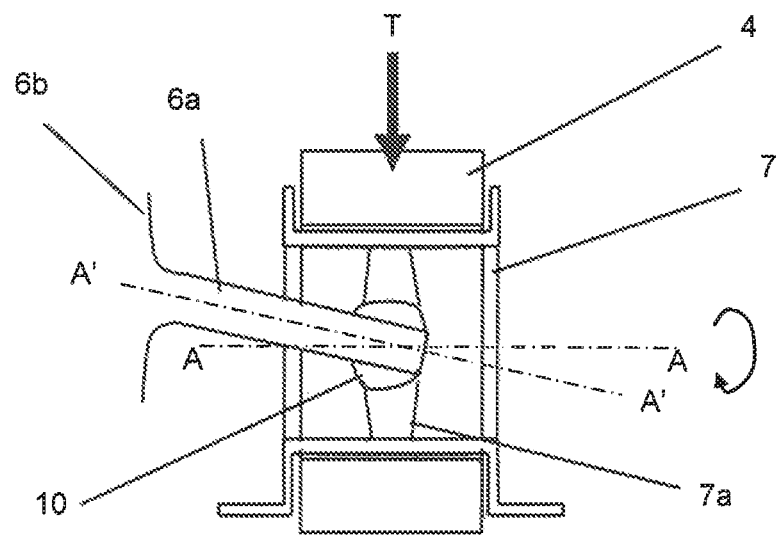
FIG. 2 shows components of the centrifugal carrier, output carrier and planet gears of the arrangement of FIG. 1 in greater detail.

FIGS. 1 and 2 have been described in more detail above.

Figure 3:
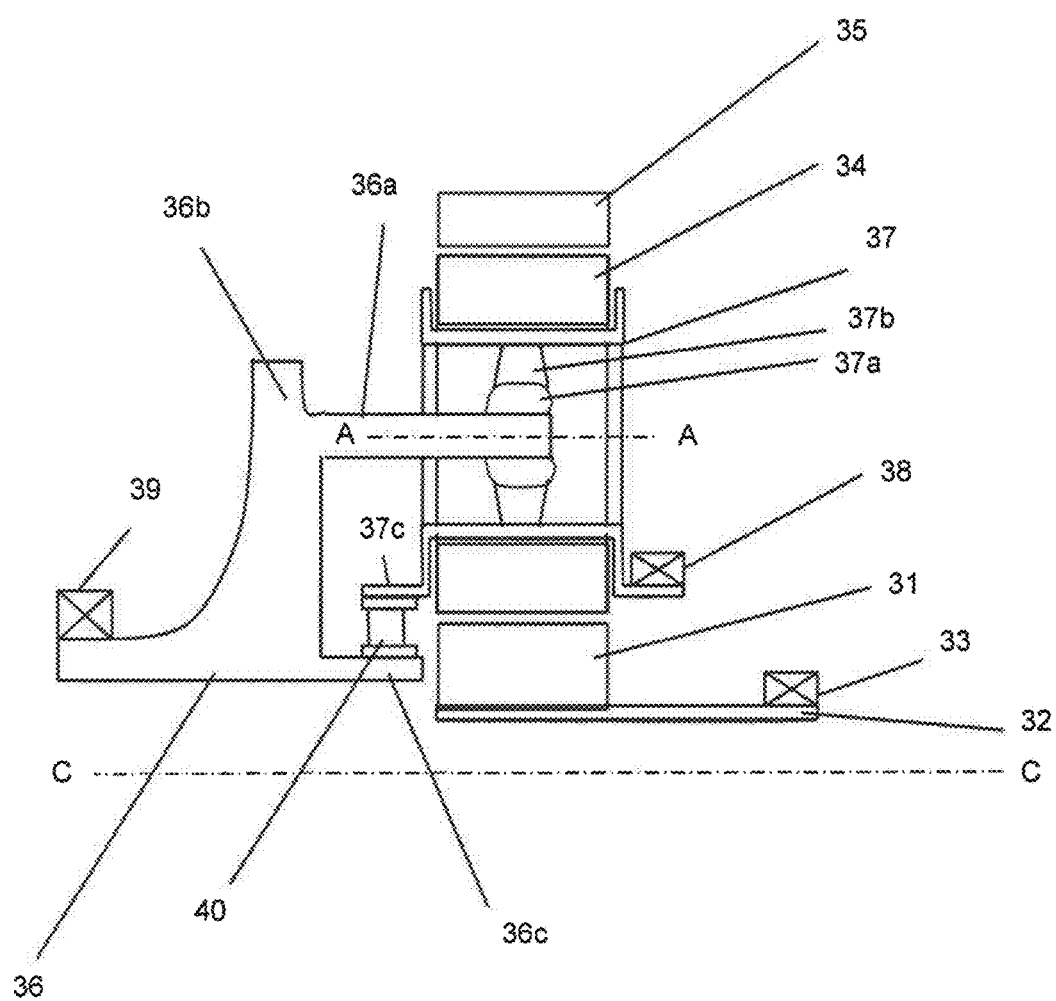
FIG. 3 shows an embodiment of the invention.

As can be seen in FIG. 3 a transmission system comprises a gear box having a sun gear 31. The sun gear 31 is fixedly mounted to an input shaft 32 which is mounted for rotation in a first bearing 33. The sun gear 31 meshes with an array of planet gears 34 (only one of which is shown) arranged around the toothed circumference of the sun gear 31. A ring gear 35 encircles and meshes with the planet gears 34. The ring gear 35 is fixed in position and so, upon rotation of the sun gear 31, the planetary gears 34 are forced to rotate around their individual axes and travel within the ring gear 34 and around the sun gear 31.

The planet gears 34 are each mounted for rotation on a centrifugal carrier 37. An arm 36a of an output carrier 36b is arranged to transmit the output via an output shaft 36 which shares a common axis C-C with the input shaft 32. The arm is connected to the centrifugal carrier 37 by connectors 37b via a pivot or spherical bearing 37a allowing some limited pivotal movement of the arm 36a with respect to the centrifugal carrier 37 into which the planet gears 34 are mounted. The centrifugal carrier 37 is arranged for rotation about the axis C-C by means of a second bearing 38.

The output shaft 36 is further mounted for rotation with respect to a static casing (not shown) by means of a third bearing 39. The output carrier 36b includes an axial extension 36c which sits in the same axial plane as an annular collar 37c of the centrifugal carrier 37. An annular connector 40 bridges the radial gap between the axial extension 36 and the collar 37c fixing the radial separation between them. Whilst the connector 40 is very stiff in a radial direction, it is engineered to be flexible in torsion to accommodate small angular deflection of the arms 36a without generating large shear loads between the two carriers 36a, 37 which would be deleterious to gear alignment. It is to be noted that the structure is configured to accommodate rotation purely through elastic deformation, i.e. without any sliding contacts. Therefore, there is significantly reduced susceptibility to wear allowing the balance of the gearbox to be maintained for long periods, possibly its entire operational life.

Figure 4:
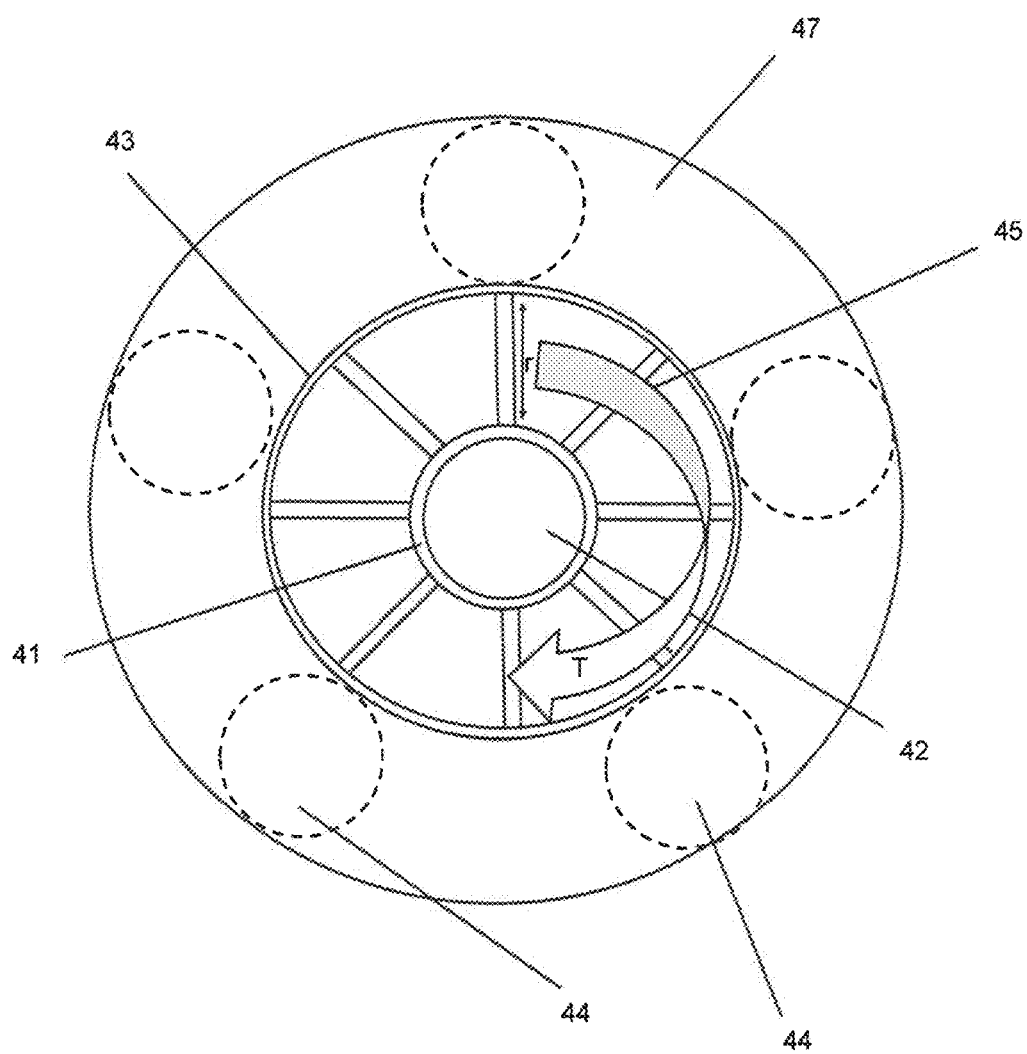
FIG. 4 shows a first embodiment of a connector suitable for use in a transmission system in accordance with the invention.

FIG. 4 shows one embodiment of a suitable connector. As can be seen in FIG. 4, a connector comprises an inner support ring 41 which defines an aperture 42 through which, in use, an axial extension (for example 36c of FIG. 3) of an output carrier (for example 36a of FIG. 3) is received. The inner support ring 41 is coaxially and radially aligned with an outer support ring 43 which, in use, is secured to an inner circumferential wall of a centrifugal carrier 47 which supports an annular array of planet gears 44. A number of radial spines 45 extend between the inner 41 and outer 43 support rings. The spines 45 are engineered to be stiff in a radial direction r whereby to maintain a constant radial separation between the carriers but flexible under a torsional load represented by arrow T.

Figure 5:
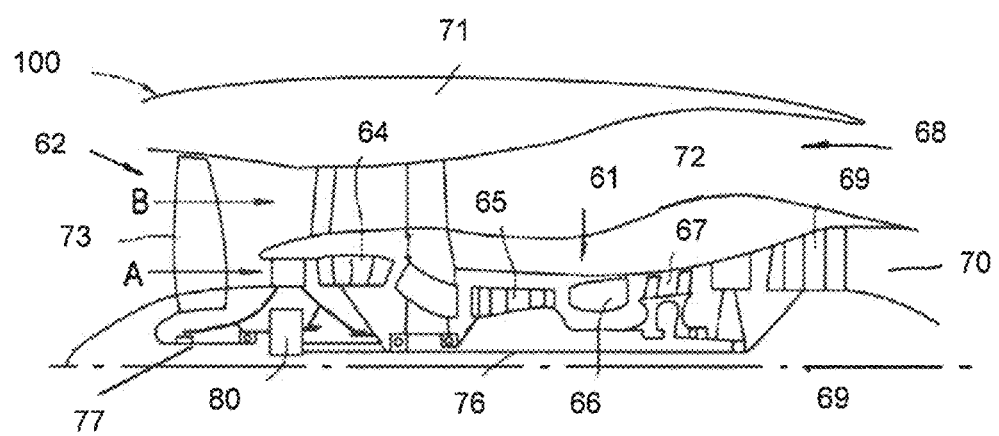
FIG. 5 shows a gas turbine engine into which a transmission system in accordance with the invention might be usefully incorporated.

Referring to FIG. 5, a two-shaft gas turbine engine 100 has a principal rotational axis 69. The engine 100 comprises an air intake 62 and a propulsive fan 73 that generates two airflows A and B. The gas turbine engine 100 comprises a core engine 61 having, in axial flow A, a low pressure booster compressor 64, a high-pressure compressor 65, combustion equipment 66, a high-pressure turbine 67, a low pressure turbine 69 and a core exhaust nozzle 70. A nacelle 71 surrounds the gas turbine engine 100 and defines, in axial flow B, a bypass duct 72 and a bypass exhaust nozzle 68. The fan 73 is attached to and driven by the low pressure turbine 69 via shaft 76 and epicyclic (planetary) gearbox 80.

The gas turbine engine 100 works in a conventional manner so that air in the core airflow A is accelerated and compressed by the high pressure booster compressor 64 and directed into the high pressure compressor 65 where further compression takes place. The compressed air exhausted from the high pressure compressor 65 is directed into the combustion equipment 66 where it is mixed with fuel and the mixture combusted. The resultant hot combustion products then expand through, and thereby drive the high pressure and low pressure turbines 67, 69 before being exhausted through the nozzle 70 to provide some propulsive thrust. The high pressure turbine 67 drives the high pressure compressor 65 by a suitable interconnecting shaft. The fan 73 normally provides the majority of the propulsive thrust.

The low pressure turbine shaft 76 together with the epicyclic (planetary) gear box 80 and a fan input shaft 77 provide a transmission system for reducing the speed of the turbine 69 to an appropriate speed for the fan 73. This transmission system may be configured in accordance with the invention.

Other gas turbine engines to which the present disclosure may be applied may have alternative configurations. By way of example such engines may have an alternative number of interconnecting shafts (e.g. three) and/or an alternative number of compressors and/or turbines.

It will be understood that the invention is not limited to the embodiments above-described and various modifications and improvements can be made without departing from the scope of the invention as defined by the accompanying claims. Except where mutually exclusive, any of the features may be employed separately or in combination with any other features and the disclosure extends to and includes all combinations and sub-combinations of one or more features described herein.

The invention claimed is:

1. A transmission system for transmitting a change of speed between two rotating shafts, the transmission system comprising;
    a planetary gear box comprising a sun gear arranged for rotation with a first shaft travelling at a first speed, a plurality of planet gears contained within a ring gear and arranged to orbit the sun gear when the sun gear rotates and the ring gear is in a fixed position, each planet gear mounted for rotation on a centrifugal carrier,
    an output carrier comprising a body having a plurality of arms each aligned with an axis of rotation of a planet gear and held within the centrifugal carrier by one or more supports extending in a radial plane, and an output shaft extending from the body in coaxial alignment with an input shaft, wherein a connector which is stiff in a radial dimension but flexible under torsional load is arranged between the output carrier and the centrifugal carrier.

2. A transmission system as claimed in claim 1 wherein the connector comprises a spoked structure having an inner and an outer annular ring and spokes extending in a radial plane.

3. A transmission system as claimed in claim 2 wherein the material of the spokes is selected to have directional stiffness and the spokes are arranged to provide stiffness in the radial direction and torsional flexibility.

4. A transmission system as claimed in claim 2 wherein the geometry of the spokes is configured to provide the radial stiffness and torsional flexibility.

5. A transmission system as claimed in claim 1 wherein the connector is provided in the form of a disc from which material has been removed to provide an inner annulus and a plurality of extensions in a radial plane connected by an outer annulus.

6. A transmission system as claimed in claim 1 wherein the connector is built to a pre-defined shape using an additive layer manufacturing method.

7. A transmission system as claimed in claim 1 wherein the connector extends between axially extending surfaces of the centrifugal carrier and the output carrier and the axially extending surface of the centrifugal carrier is arranged to sit radially outwardly of the axially extending surface of the output carrier.

8. A transmission system as claimed in claim 1 wherein the connector extends between axially extending surfaces of the centrifugal carrier and the output carrier and the axially extending surface of the centrifugal carrier is arranged to sit radially inwardly of the axially extending surface of the output carrier, wherein radially inwardly is defined by a radially inward direction with respect to rotation of the entire transmission system.

9. A gas turbine engine having a transmission system for transmitting a first speed from a first shaft to a second speed for a second shaft, the transmission system configured in accordance with claim 1.

10. A gas turbine engine as claimed in claim 9 wherein the first shaft is a turbine shaft and the second shaft is a fan shaft.

* * * * *